J. ACEBAL.
HIGH PRESSURE SAFETY VALVE.
APPLICATION FILED FEB. 7, 1917. RENEWED JUNE 3, 1918.
1,290,030. Patented Jan. 7, 1919.
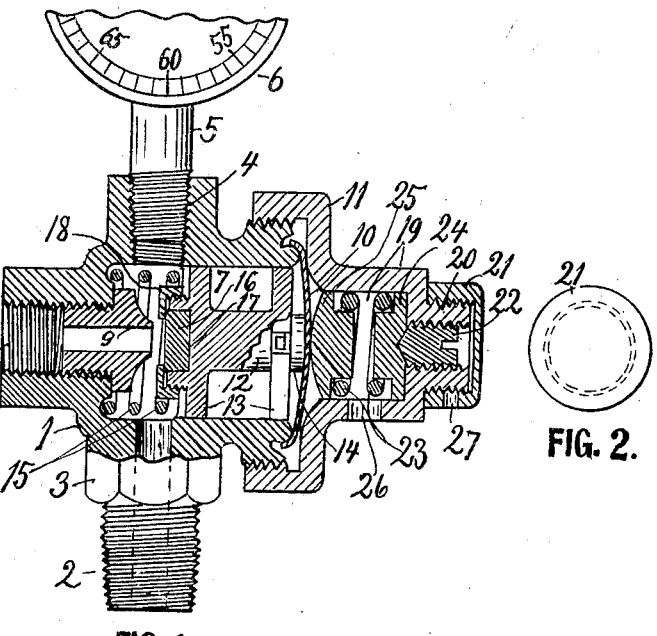
FIG. 4. FIG. 3. FIG. 1. FIG. 2.
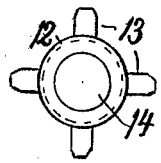 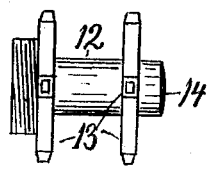 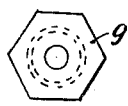
FIG. 5. FIG. 6. FIG. 7.
 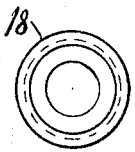 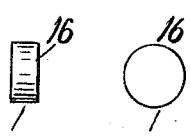
FIG. 8. FIG. 9. FIG. 10. FIG. 11.
 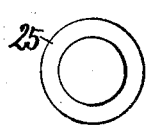 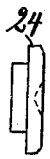  
FIG. 12. FIG. 13. FIG. 14. FIG. 15. FIG. 16. FIG. 17.
INVENTOR:
Joseph Acebal,
By his ATTORNEY:
A. M. Carlsen

UNITED STATES PATENT OFFICE.

JOSEPH ACEBAL, OF HABANA, CUBA.

HIGH-PRESSURE SAFETY-VALVE.

1,290,030.  Specification of Letters Patent.  Patented Jan. 7, 1919.

Application filed February 7, 1917; Serial No. 147,079. Renewed June 3, 1918. Serial No. 238,033.

*To all whom it may concern:*

Be it known that I, JOSEPH ACEBAL, a citizen of Cuba, residing at Habana, Cuba, have invented a new and useful High-Pressure Safety-Valve, of which the following is a specification.

My invention relates to safety valves used to prevent too high pressure of steam, gas, compressed air and similar elements; and the object is to provide a novel, efficient and simple safety valve, which can not easily be put out of order by accident or by inexperienced or unskilled persons and which is especially adapted for high pressure.

In the accompanying drawing:

Figure 1 is a partly sectional side elevation of my improved safety valve and a pressure gage mounted upon it. Fig. 2 is a righthand view of the adjacent cap in Fig. 1. Fig. 3 is a face view and Fig. 4 an end view of the diaphragm 10 in Fig. 1. Fig. 5 is a right hand end view of the valve plug. Fig. 6 is a side view of the valve plug shown in Fig. 5. Fig. 7 is a right hand end view of the valve seat 9 in Fig. 1. Fig. 8 is an edge view and Fig. 9 is an inside view of the clamping cap 18 in Fig. 1. Fig. 10 is a side view and Fig. 11 an end view of a fiber plug or disk carried by the valve plug. Fig. 12 is an edge view and Fig. 13 a face view of the inner spring support or disk 25 in Fig. 1. Fig. 14 is an edge view and Fig. 15 a face view of the outer spring support 24 in Fig. 1. Fig. 16 is a side view and Fig. 17 an end view of either one of two compression coil springs employed in the valve, one stronger than the other.

Referring to the drawing by reference numerals, 1 designates the main valve shell or chamber. It is provided with a hollow stem 2 having a hexagonal, or octagonal, portion, 3, for a wrench to engage and screw the stem into a threaded aperture in the steam boiler or other vessel upon which the safety valve is to be used.

Threaded in the top of the shell is a hole 4 for the pipe 5 of a pressure indicating gage 6. And in the middle of the shell is a horizontal cylindrical chamber 7, having in one end an exhaust opening 8 with a valve seat 9 secured into the inner end of it. The opposite end of the cylinder is closed by a diaphragm 10, held in place by a clamping cover 11 threaded upon the end of the shell and pressing the diaphragm against the end of the shell.

Slidable in the cylindrical valve chamber 7 is a valve plug 12, having spider arms 13 to hold it in axial position in the chamber and allow the steam or compressed air to pass freely along to the diaphragm 10.

One end of the valve plug is provided with a central stud 14, which is at all times held in contact with the diaphragm by a light coil spring 15. The other end is provided with a disk 16, of fiber or other material softer than the valve seat and retained in a cavity 17 by an annular screw cap 18.

The cap or section 11 of the shell is formed with a central cylindrical extension 19, of smaller diameter than the valve chamber and provided with an externally and internally threaded end portion 20, which is closed by a screw cap 21. In said end extension 19 is arranged a compression coil spring 23, much stronger than the spring 15, and having its ends supported by two movable disks 24, 25; the latter disk having a central convex face bearing against the diaphragm, while the disk 24 has a central cavity for the point of the screw 22; said screw serving to so regulate the tension of the spring 23 that the valve will open automatically and let out the surplus pressure when the gage 6 indicates a higher pressure than it is desired to carry. 26, 27 are outlet apertures in the hollow extension 19, and the cap 21, respectively, to guard against possible air pressure therein. The diaphragm 10 may be made of sheet copper or other metal which will easily bend or spring back and forth.

In the operation of the device, the spring 23 keeps the valve normally closed, but when the pressure of steam or air in the valve chamber 7 gets higher than predetermined to have it, it acts on the diaphragm and compresses the spring 23 and thereby gives the spring 15 a chance to move the valve plug away from the valve seat 9, through which the surplus steam or air is thus allowed to escape. The cap 21 may be screwed tightly in place during transportation or other handling of the device, or at any time when it may be deemed advisable to thereby protect the screw 22 from unwarranted turning.

What I claim is:

1. In a safety valve, a valve chamber having a hollow stem for securing it to a vessel holding steam, air or gas under pressure; said chamber having at one end an outlet opening with an inwardly facing valve seat therein, a spider-shaped valve plug slidable in the chamber and adapted to close with one end the opening in the valve seat, and having at the other end a central stud, a diaphragm arranged to bear with its middle portion against the stud, a coil spring beyond the diaphragm, a movable member supporting each end of the spring, one of said members having a convex face bearing against the diaphragm, a tension regulating screw arranged to act on the other member, and a comparatively light spring arranged to act on the valve plug to hold it at all times in contact with the diaphragm.

2. In a safety valve, a valve chamber having a hollow stem securable to a boiler or other vessel in which pressure is raised; said chamber having at one end an outlet with a valve seat therein, a spider-shaped valve plug slidable in the chamber and adapted to close with one end the opening in the valve seat, and having at the other end a central stud, a diaphragm arranged to bear with its middle portion against the stud, a coil spring beyond the diaphragm, a movable member supporting each end of the spring, one of said members having a convex face bearing against the diaphragm and a tension regulating screw arranged to act on the other member, a lighter coil spring arranged with one end about the valve seat and the other against the spider so as to act on the valve plug to hold it at all times in contact with the diaphragm; said valve chamber being made up of two sections, one section screw-threaded into the other and having near said threaded portion internal annular shoulders between which the diaphragm is clamped.

3. In a safety valve, a valve chamber having a hollow stem for securing it to a vessel holding steam, air or gas under pressure; said chamber having at one end an outlet opening with an inwardly facing valve seat therein, a spider-shaped valve-plug slidable in the chamber and adapted to close with one end the opening in the valve seat, and having at the other end a central stud, a diaphragm arranged to bear with its middle portion against the stud, a coil spring beyond the diaphragm, a movable member supporting each end of the spring, one of said members having a convex face bearing against the diaphragm, a tension regulating screw arranged to act on the other member, and a comparatively light spring arranged to act on the valve plug to hold it at all times in contact with the diaphragm, said valve chamber having a vent hole intermediate the spring-supporting members.

4. The combination of a valve chamber having a valve seat through which to exhaust surplus pressure, a spider-shaped valve plug arranged to close said seat, a spring moving said plug against the seat, a screw for regulating the tension of said spring, a screw-cap protecting and concealing said screw, means for the pressure to act on and allow the plug to move from the seat, and an auxiliary spring acting between the spider-shaped plug and the base of the valve seat to insure such movement of the plug.

In testimony whereof I affix my signature.

JOSEPH ACEBAL.